United States Patent
Bingham et al.

(10) Patent No.: US 7,078,012 B2
(45) Date of Patent: Jul. 18, 2006

(54) METHOD OF PRODUCING A HIGH PRESSURE GAS

(75) Inventors: Dennis N. Bingham, Idaho Falls, ID (US); Kerry M. Klingler, Idaho Falls, ID (US); William T. Zollinger, Idaho Falls, ID (US)

(73) Assignee: Eattelle Energy Alliance, LLC, Idaho Falls, ID (US)

( * ) Notice: Subject to any disclaimer, the term of this patent is extended or adjusted under 35 U.S.C. 154(b) by 317 days.

(21) Appl. No.: 10/685,771

(22) Filed: Oct. 14, 2003

(65) Prior Publication Data

US 2005/0079130 A1    Apr. 14, 2005

(51) Int. Cl.
B01J 19/00    (2006.01)
C01B 3/02    (2006.01)

(52) U.S. Cl. .................. 423/659; 423/648.1; 423/657; 423/DIG. 11

(58) Field of Classification Search ............. 423/648.1, 423/657, 659, DIG. 11
See application file for complete search history.

(56) References Cited

U.S. PATENT DOCUMENTS

| | | | | |
|---|---|---|---|---|
| 1,889,714 A | * | 11/1932 | Urbain ........................ | 423/657 |
| 2,534,533 A | * | 12/1950 | Schlesinger et al. ........ | 423/288 |
| 4,064,226 A | * | 12/1977 | Becker et al. ............... | 423/657 |
| 4,356,163 A | * | 10/1982 | Davidson .................. | 423/648.1 |
| 4,397,925 A | | 8/1983 | Magahed ................... | 429/207 |
| 4,492,741 A | | 1/1985 | Struthers ..................... | 429/34 |
| 4,636,445 A | | 1/1987 | Yamano et al. ............... | 429/53 |
| 4,744,946 A | | 5/1988 | Sasai et al. .................. | 420/443 |
| 4,808,282 A | | 2/1989 | Gregory ..................... | 204/58.5 |
| 4,904,357 A | | 2/1990 | Sharifian et al. .......... | 204/73 R |
| 4,931,154 A | | 6/1990 | Hale et al. ................. | 204/59 R |
| 5,298,037 A | | 3/1994 | Murphy et al. ............ | 29/623.1 |
| 5,728,464 A | | 3/1998 | Checketts ................... | 428/403 |
| 5,804,329 A | | 9/1998 | Amendola .................... | 429/34 |
| 5,817,157 A | | 10/1998 | Checketts ................... | 422/129 |
| 5,997,821 A | | 12/1999 | Joshi .......................... | 422/129 |
| 6,221,310 B1 | | 4/2001 | Checketts .................... | 266/48 |
| 6,235,235 B1 | | 5/2001 | Checketts ................... | 266/153 |
| 6,576,362 B1 | | 6/2003 | Hanlon ........................ | 429/34 |
| 7,001,681 B1 | * | 2/2006 | Wood .......................... | 429/17 |
| 2004/0071630 A1 | * | 4/2004 | Jorgensen ................ | 423/648.1 |

FOREIGN PATENT DOCUMENTS

CA    2225978    6/1999

* cited by examiner

Primary Examiner—Stanley S. Silverman
Assistant Examiner—Timothy C. Vanoy
(74) Attorney, Agent, or Firm—Wells St. John P.S.

(57) ABSTRACT

A method of producing a high pressure gas is disclosed and which includes providing a container; supplying the container with a liquid such as water; increasing the pressure of the liquid within the container; supplying a reactant composition such as a chemical hydride to the liquid under pressure in the container and which chemically reacts with the liquid to produce a resulting high pressure gas such as hydrogen at a pressure of greater than about 100 pounds per square inch of pressure; and drawing the resulting high pressure gas from the container.

22 Claims, 1 Drawing Sheet

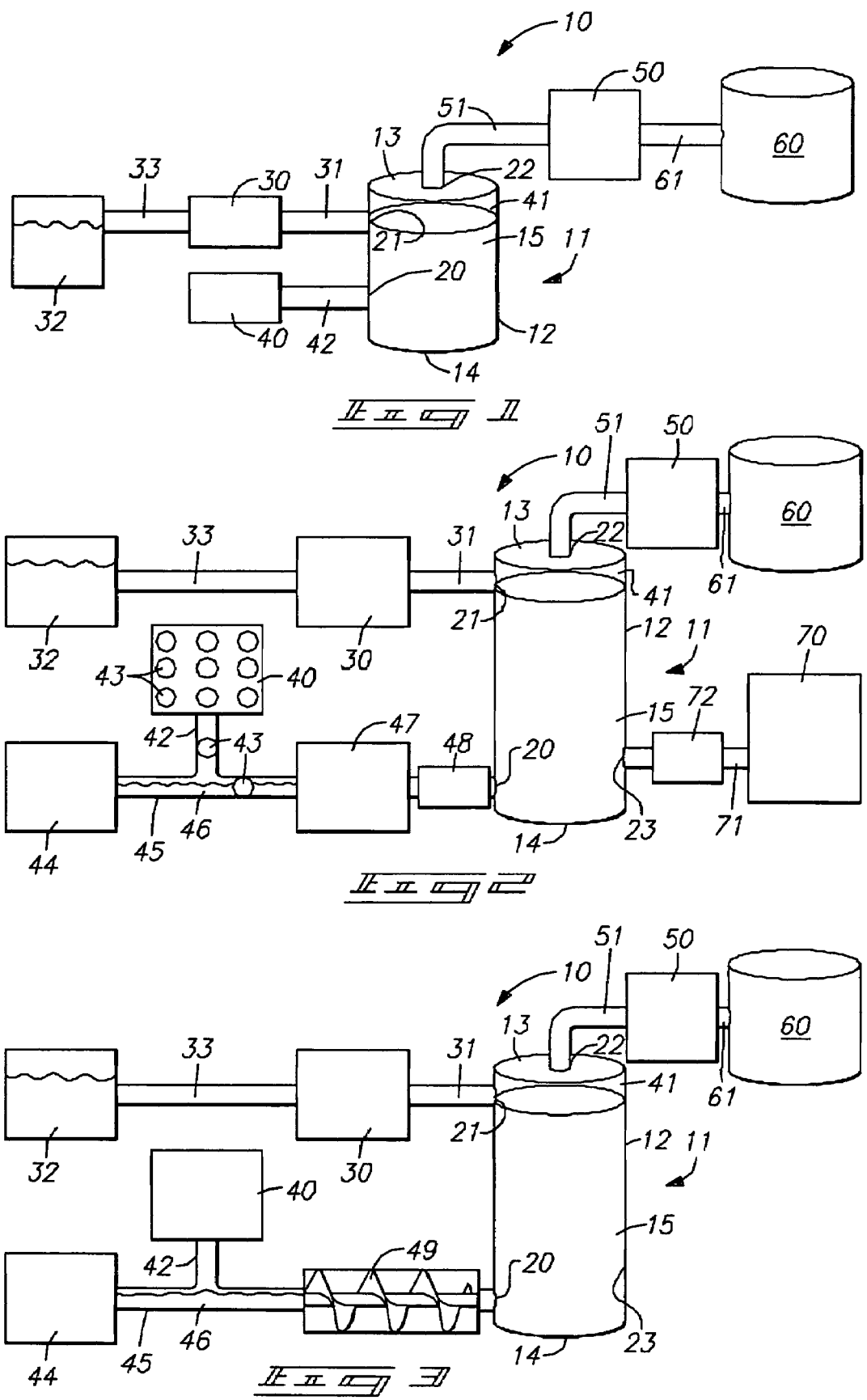

US 7,078,012 B2

METHOD OF PRODUCING A HIGH PRESSURE GAS

GOVERNMENT RIGHTS

The United States Government has certain rights in the following invention pursuant to Contract No. DE-AC07-99ID13727 between the U.S. Department of Energy and Bechtel BWXT Idaho, Id.

TECHNICAL FIELD

The present invention relates to a method of producing a high pressure gas and more specifically to a method which includes supplying a chemical hydride and reacting it with a liquid which has been previously placed under pressure.

BACKGROUND OF THE INVENTION

The prior art is replete with numerous examples of methods and devices for storing and generating hydrogen and which can for example, be subsequently utilized as a fuel in an internal combustion engine, fuel cell or similar assemblies.

It has long been known that hydrogen can be produced from a chemical reaction of an alkali metal with water and various arrangements such as what is shown in U.S. Pat. No. 5,728,464 have been devised to enclose a reactive material such as an alkali metal or metal hydride that which, upon exposure to water, produces hydrogen as a product of that reaction. This released hydrogen gas is typically compressed, and then provided to end users in vessels at high pressures. Currently, pressures of 5,000 pounds PSI are in use, and pressures of up to 10,000 PSI have been proposed. In order to reach these higher pressures, suppliers employ specialized compressors which tend to consume increasing amounts of electrical energy. This special handling of the generated hydrogen increases the incremental cost of supplying the pressurized hydrogen significantly.

A method of producing a high pressure gas, such as hydrogen, and which avoids the shortcomings attendant with the prior art devices and practices is the subject matter of the present invention.

SUMMARY OF THE INVENTION

A first aspect of the present invention relates to a method of producing a high pressure gas which includes providing a container; supplying the container with a liquid; increasing the pressure of the liquid within the container; supplying a reactant composition to the liquid under pressure in the container and which chemically reacts with the liquid to produce a resulting high pressure gas; and drawing the resulting high pressure gas from the container.

Another aspect of the present invention relates to a method of producing a high pressure gas which includes providing a container which is operable to enclose a fluid under pressure; supplying a source of fluid which is received and enclosed by the container; increasing the pressure of the fluid enclosed within the container; rendering a reactant composition substantially chemically non-reactive; combining the substantially non-reactive reactant composition with a second fluid stream, and coupling the second fluid stream in fluid flowing relation relative to the container; supplying the reactant compound to the container in a manner which causes the previously non-reactive composition to chemically react with the fluid in the container to produce high pressure hydrogen gas; and drawing the high pressure hydrogen from the container.

Still another aspect of the present invention relates to a method of producing a high pressure gas which includes providing a container having a volume and which is operable to enclose a fluid under pressure; supplying a source of water to the container, and substantially filling the volume thereof; increasing the pressure of the water in the container; coupling a fluid stream in fluid flowing relation relative to the container; supplying a source of a metal or metal hydride to the fluid stream; metering the fluid stream carrying the source of the metal or metal hydride to the container; reacting the metal or metal hydride with the water which is under pressure to generate high pressure hydrogen gas, and other byproducts; drawing the high pressure hydrogen gas from the container and supplying it as a fuel; depleting the water in the container by chemically reacting the water with the metal or metal hydride; releasing the pressure from the container; and removing the byproducts produced by the chemical reaction of the metal or metal hydride with the water, and replenishing the supply of water.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 1 is a greatly simplified view of a first arrangement for practicing the method of the present invention.

FIG. 2 is a greatly simplified view of a second arrangement for practicing the method of the present invention.

FIG. 3 is a greatly simplified view of a third arrangement for practicing the method of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A first described arrangement which is useful in practicing the methodology of the present invention is shown in FIG. 1. As seen therein, the methodology includes providing a container which is generally indicated by the numeral 11. The container 11 is defined by a sidewall 12, and further includes a top surface 13, and a bottom surface 14 which are attached to the sidewall and which define an internal cavity 15. First, second and third passageways or apertures 20, 21 and 22 are formed through the sidewall 12 and couple the internal cavity 15 in fluid flowing relation relative to other assemblies which will be discussed hereinafter.

The method of producing a high pressure gas 10 of the present invention includes a step of supplying the container 11 with a liquid, and increasing the pressure of the liquid within the container. In this regard, and referring to FIG. 1, a charging pump 30 is provided and is coupled to the second passageway 21 by way of a conduit or other fluid passageway 31. The charging pump 30 is coupled in fluid flowing relation relative to a source of a liquid 32 by way of a conduit or fluid passageway which is generally indicated by the numeral 33. The charging pump supplies the fluid to the container and increases the liquid pressure within the container 11 to greater than about 100 pounds per square inch.

The liquid may include a substantially homogenous solution such as water, or a solution including two or more compositions, including catalysts which would facilitate the production or generation of the high pressure gas.

As seen in FIG. 1, the method of producing a high pressure gas 10 of the present invention further includes the step of supplying a reactant composition 40 which may include a metal or metal hydride to the liquid 32 which is under pressure within the container 11. The reactant composition 40 chemically reacts with the liquid 32 to produce a resulting high pressure gas 41.

The source of the reactant composition 40 is coupled in fluid communication with container 11 by way of a passageway or conduit 42 which allows the movement of the reactant composition into the cavity 15. For purposes of the present application, the high pressure gas 41 will be described hereinafter as high pressure hydrogen gas. It should be understood that the present teachings are not limited to the production of hydrogen gas, but may be applied to other useful gases. A hydrogen dryer 50 is provided, and a conduit or other fluid passageway 51 couples the third passageway 22 in fluid flowing relation relative to the hydrogen dryer. The hydrogen dryer 50 is operable to remove any undesirable gaseous fluids such as water vapor which is mixed with the released high pressure hydrogen gas 41. The hydrogen dryer is coupled in fluid flowing relation relative to a storage container 60 by way of a fluid passageway which is generally indicated by the numeral 61. The storage container for the high pressure hydrogen gas 41 may take on various forms including single or multiple containers, and may further be integrated with other processes. It should also be understood, in certain arrangements, a hydrogen dryer may not be required. For example, if the high pressure hydrogen gas 41 will be later supplied to an assembly such as a proton exchange membrane fuel cell, it may be actually advantageous to have a gaseous liquid, such as water vapor, supplied with same. Such gaseous liquids such as water vapor would actually encourage the production of electricity in various proton exchange membrane fuel cell arrangements.

Referring now to FIG. 2, a greatly simplified view of a second arrangement for practicing the method of the present invention 10 is shown. To the extent that like assemblies are described, similar numbers will be utilized. The method for producing a high pressure gas 10 includes providing a container 11 which is operable to enclose a fluid 32 under pressure. Similar to that described with FIG. 1, the container has a sidewall 12, and top and bottom surfaces 13 and 14 which are joined together to form a cavity 15. First, second, third and fourth passageways 20, 21, 22 and 23 are formed through the sidewall 12 and couple the cavity 15 in fluid flowing relation relative to other assemblies which will be described hereinafter. As was the case with FIG. 1, a charging pump 30 is provided and is coupled, by way of a fluid passageway 31 to the cavity 15. Still further, the method comprises supplying a source of a fluid 32 to the cavity 15 and increasing the pressure of the fluid enclosed within the container 11 by means of the charging pump 30. In the arrangement as shown in FIG. 2, the method further includes rendering a reactant composition 40 substantially chemically non-reactive, as will be described below. The supply of the reactant compound 40 performs in a manner similar to that described in FIG. 1, that is when the reactant compound is combined with the liquid 32 which has been pumped to high pressure within the container 11, it produces a high pressure hydrogen gas 41. The supply of the reactant compound 40 which is substantially chemically non-reactive includes a step of enclosing the reactant composition 40 in a frangible substantially chemically non-reactive enclosure 43. The usefulness of compositions within these types of enclosures are discussed in greater detail in U.S. Pat. Nos. 5,728,464 and 5,817,157, the teachings of which are incorporated herein. Therefore the supply of the reactant composition 40 includes a plurality of these frangible containers 43. As further seen in FIG. 2, a second source of a fluid 44 is provided, and a fluid passageway or conduit 45 couples the second source of fluid 44 in fluid flowing relation relative to the first passageway 20. The fluid passageway 45 provides a pathway for a fluid stream 46 which is also coupled in fluid flowing relation relative to the conduit or fluid passageway 42. As illustrated, the frangible containers 43 are operable to move along the conduit or passageway 42 and travel along with the fluid stream 46 which is produced from the second source of fluid 44.

The fluid passageway 45 is coupled in fluid flowing relation relative to a valve assembly 47. The valve assembly is operable to selectively remove a portion of the fluid stream 46 which contains some of the frangible containers 43 from the remaining fluid stream and deliver the isolated portion of the fluid stream 46 along with some of the frangible containers 43 to the cavity 15 of the container 11. The valve assembly 47 is coupled in fluid flowing relation relative to an assembly 48 which is operable to fracture or otherwise split open the frangible containers 43 thereby releasing the reactant composition 40 which may include a metal or metal hydride to the source of liquid 32 which has been place under pressure by the charging pump 30. The release of this reactant compound 40 causes a chemical reaction within the cavity 15 which produces the high pressure hydrogen gas 41 which was discussed above. Similar to that earlier discussed with respect to FIG. 1, the arrangement shown in FIG. 2 includes a hydrogen dryer 50 for removing gaseous water vapor which may be mixed with the hydrogen gas 41. A storage container 60 for receiving and storing the high pressure hydrogen gas 41 which is generated as a result of this methodology is provided and is coupled in fluid flowing relation relative to the hydrogen dryer 50. FIG. 2 further illustrates a by-product container, which is generally indicated by the numeral 70, and which is coupled by way of a fluid conduit or passageway 71 to the container 11. A valve assembly 72 is provided and is disposed in fluid metering relation along the fluid conduit 72. The by-product container 70 is operable to selectively receive the resulting by-products produced as a result of chemical reaction which takes place in the cavity 15 when the valve assembly 72 is operated. For example, in the instance where, sodium hydride, or sodium borohydride are employed as the reactant compound 40, the by-product container 70 would be operable to receive the by-products of the chemical reaction which would include sodium hydroxide or sodium borate. The by-products would also include the remains of the frangible containers 43 which have been fractured by the assembly 48.

Referring now to FIG. 3, a greatly simplified view of a third arrangement which can be utilized to practice the method of the present invention is shown. FIG. 3 shows many of the features of FIGS. 1 and 2. As was discussed with respect to FIG. 2, similar numbers indicate similar assemblies. As seen in FIG. 3, a container 11 defining a cavity 15 for enclosing a liquid 32 which has been placed under pressure by a charging pump 30 is provided. In FIG. 3 it will also be seen that a source of reactant compound 40 (such as a metal or metal hydride) is provided, and is coupled by way of a conduit 42, in dispensing relation relative to a fluid passageway 45. A second source of a fluid 44 is provided and is coupled in fluid flowing relation relative to the passageway 45. The second source of the fluid 44 is substantially inert, and forms, in part, the fluid stream 46 which is subsequently mixed with the source of the reactant compound 40 which is supplied by way of the passageway 42, to the passageway 45. The inert fluid is any liquid which is not adversely chemically reactive with the reactant compound 40. The mixture of the inert fluid 44, and the reactant compound 40 is then supplied to an assembly 49, (here illustrated as a continuous screw or auger) and which is operable to supply the mixture of the inert fluid 44, and the reactant compound 42 to the chamber 15. Once the reactant compound and the inert fluid are received in the chamber 15, the reactant compound 40 chemically reacts with the fluid 32 in order to produce the high pressure hydrogen gas 41. Similar to that shown with FIGS. 1 and 2, the high pressure hydrogen gas is subsequently supplied to a hydrogen dryer 50 by way of a conduit 51, and then is provided to a storage container 60. As was discussed with FIG. 1, the hydrogen dryer may be omitted under certain circumstances.

OPERATION

The operation of the described embodiments of the present invention are believed to be readily apparent and are briefly summarized at this point.

Referring now to the drawings, a method 10 of producing a high pressure gas 41 of the present invention includes, in its broadest aspect, providing a container 11; supplying the container 11 with a liquid 32; increasing the pressure of the liquid 32 within the container 11; supplying a reactant composition 40 to the liquid 32 under pressure in the container 11 and which chemically reacts with the liquid 32 to produce a high pressure gas 41; and drawing the resulting high pressure gas 41 from the container 11. The step of supplying the reactant compound 40 may further comprise supplying a metal or metal hydride which chemically reacts with the liquid 32 to produce a resulting high pressure gas 41 which predominately comprises hydrogen. As best understood by a study of FIG. 2, the step of supplying the reactant composition 40 to the liquid 32 which has been placed under pressure may further comprise enclosing the reactant composition 40 in a plurality of frangible containers 43; and releasing the reactant composition 40 from the frangible enclosure before the reactant compound is supplied to the container 11. This is done by means of the assembly 48.

Referring still to FIG. 2, it will be seen that after the step of enclosing the reactant composition 40, and before the step of releasing the reactant composition 40, the method 10 may further comprise providing a fluid stream 46 which is disposed in fluid flowing communication with the container 11, and which receives and moves the frangible enclosures 43 along a course of travel; and providing an assembly 48 along the course of travel and which fractures the respective enclosures 43 to release the reactant composition 40 therefrom. The fluid stream 46 may, as seen in FIG. 3, represent a first form of a continuous conveyor means coupled in selective fluid flowing relation relative to the container 11. Still further, the screw or auger 49 as shown in FIG. 3 represents a second form of a continuous conveyor for coupling the fluid stream 46 in fluid flowing relation relative to the container 11.

FIG. 3 also illustrates a further step in the present methodology and which includes mixing the reactant compound 40 with an inert fluid 44 and delivering the mixture of the reactant compound and the inert fluid to the continuous conveyor. As seen in FIG. 2, the chemical reaction of the reactant composition 40 with the liquid 32 in the container 11 reactively consumes the liquid 32. Therefore, the method 10 further includes the steps of releasing the liquid pressure of the container 11; and replacing the liquid 32 which has chemically reacted with the reactant compound 40. In this regard, and as discussed earlier, a by-products container 70 and valve assembly 72 are provided and which are operable to remove the resulting by-products produced by the chemical reaction and other debris which might be present in the cavity 15.

The method of producing a high pressure gas of the present invention 10 more specifically includes the steps of providing a container 11 having a cavity 15 with a volume, and which is operable to enclose a fluid 32 under pressure. The source of the fluid may include a source of water 32 which is supplied to the container 11 and which substantially fills the volume thereof. In the methodology described, a charging pump 30 is provided and which increases the pressure of the water 32 in the container 11. The methodology further includes supplying a substantially inert fluid stream 46 in fluid flowing relation relative to the container 11, and supplying a source of a metal or metal hydride 40 to the fluid stream 46. The method further includes metering the fluid stream 46 carrying the source of metal or metal hydride 40 to the container 11; and reacting the metal or metal hydride 40 with the water 32 which is under pressure to generate high pressure hydrogen gas 41 and other byproducts. As seen in FIG. 2, the metal or metal hydride 40 may be enclosed in frangible containers 43, or further may be mixed with an inert carrier fluid, as earlier discussed, and supplied by way of an auger or similar assembly 49.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of producing a gas under pressure, comprising:

providing a container;

supplying the container with a liquid, and increasing the pressure of the liquid within the container;

supplying a reactant composition to the liquid under pressure in the container and which chemically reacts with the liquid to produce a resulting gas under pressure; and drawing the gas under pressure from the container.

2. A method as claimed in claim 1, and wherein supplying the reactant compound further comprises supplying a chemical hydride which chemically reacts with the liquid to produce a hydrogen gas.

3. A method as claimed in claim 1, and wherein before supplying the reactant composition to the liquid under pressure, the method further comprises:

enclosing a reactant composition in a frangible enclosure; and releasing the reactant composition from the frangible enclosure before the reactant compound is supplied to the container.

4. A method as claimed in claim 3, and wherein after enclosing the reactant composition, and before the step of releasing the reactant composition, the method further comprises:
 providing an inert fluid stream which is disposed in fluid flowing communication with the container and which receives and moves the frangible enclosure along a course of travel; and
 providing an assembly along the course of travel which fractures the enclosure to release the reactant composition therefrom.

5. A method as claimed in claim 1, and wherein before supplying the reactant composition, the method further comprises:
 providing a substantially continuous conveyor coupled in selective fluid flowing relation relative to the container, and wherein the continuous conveyor moves the reactant compound along a course of travel and into the container.

6. A method as claimed in claim 5, and wherein the continuous conveyor comprises an auger.

7. A method as claimed in claim 5, and wherein before providing the continuous conveyor, the method further comprises:
 mixing the reactant compound with an inert fluid and delivering the mixture of the reactant compound and the inert fluid to the continuous conveyor.

8. A method as claimed in claim 1, and wherein the liquid pressure is greater than about 100 pounds per square inch.

9. A method as claimed in claim 1, and wherein the chemical reaction of the reactant composition with the liquid in the container reactively consumes the liquid, and wherein the method further comprises:
 releasing the liquid pressure of the container; and
 replacing the liquid which has chemically reacted with the reactant compound.

10. A method of producing gas under pressure, comprising:
 providing a container which is operable to enclose a first liquid under pressure;
 supplying a source of a first liquid which is received and enclosed by the container, and increasing the pressure of first liquid enclosed within the container;
 rendering a reactant composition substantially chemically non-reactive;
 combining the substantially non-reactive reactant composition with a second fluid stream;
 coupling the second fluid stream in fluid flowing relation relative to the container;
 supplying the reactant compound to the container in a manner which causes the previously non-reactive composition to chemically react with the first liquid in the container to produce hydrogen gas under pressure; and
 drawing the hydrogen gas from the container.

11. A method as claimed in claim 10, and wherein supplying a source of a first liquid which is received and enclosed by the container, and increasing the pressure of the first liquid enclosed within the container further comprises:
 providing a charging pump which is coupled in fluid flowing relation relative to the container and which is operable to simultaneously supply and increase the pressure of the first liquid within the container.

12. A method as claimed in claim 11, and wherein the charging pump increases the first liquid pressure to greater than about 100 pounds per square inch.

13. A method as claimed in claim 10, and wherein rendering a reactant composition substantially chemically non-reactive further comprises:
 enclosing the reactant composition in a frangible substantially chemically non-reactive enclosure.

14. A method as claimed in claim 13, and wherein supplying the reactant composition to the container further comprises:
 providing an assembly which fractures the enclosure to release the reactant composition therefrom.

15. A method as claimed in claim 10, and wherein rendering a reactant composition substantially non-reactive further comprises:
 mixing the reactant composition with an inert fluid.

16. A method as claimed in claim 10, and wherein coupling the second fluid stream in fluid flowing relation to the container further comprises:
 providing a valve which is operable to selectively remove a portion of the second fluid stream, substantially isolate the portion of the second fluid stream from the remaining fluid stream, and deliver the isolated portion of the second fluid stream to the container.

17. A method as claimed in claim 10, and wherein the reactant composition is a metal or metal hydride which reacts with the first fluid to produce hydrogen gas and other byproducts, and wherein the first fluid is consumed in the chemical reaction, and wherein the method further comprises:
 replacing the first fluid consumed in the chemical reaction.

18. A method of producing a gas under pressure, comprising:
 providing a container having a volume;
 supplying a source of water in a first fluid stream to the container and substantially filling the volume thereof;
 increasing the pressure of the water in the container;
 coupling a second fluid stream in fluid flowing relation relative to the container;
 supplying a source of a metal or metal hydride to the second fluid stream;
 metering the second fluid stream carrying the source of metal or metal hydride to the container;
 reacting the metal or metal hydride with the water which is under pressure to generate hydrogen gas having a pressure and other byproducts;
 drawing the hydrogen gas under pressure from the container and supplying it as a fuel;
 depleting the water in the container by chemically reacting the water with the metal or metal hydride;
 releasing the pressure exerted by the water from the container; and
 removing the byproducts produced by the chemical reaction of the metal or metal hydride with the water, and replenishing the supply of water.

19. A method as claimed in claim 18, and wherein supplying the source of metal or metal hydride further comprises:
 enclosing the source of the metal or metal hydride into a plurality of frangible enclosures, and wherein the second fluid stream carries the individual frangible enclosures.

20. A method as claimed in claim 19, and further comprising:
 an assembly for fracturing the individual frangible enclosures to reactively expose the metal or metal hydride to the water which is under pressure.

21. A method as claimed in claim 18, and wherein the second fluid stream is inert, and wherein supplying the source of the metal or metal hydride to the container further comprises:
    mixing the source of the metal or metal hydride with the inert second fluid stream, and wherein the mixture of the metal or metal hydride and the inert second fluid stream are supplied to the container.

22. A method as claimed in claim 18, and wherein metering the second fluid stream further comprises:

removing a portion of the second fluid stream;

isolating the portion of the second fluid stream from the remaining second fluid stream; and delivering the isolated portion of the second fluid stream to the container.

\* \* \* \* \*

UNITED STATES PATENT AND TRADEMARK OFFICE
CERTIFICATE OF CORRECTION

PATENT NO. : 7,078,012 B2  Page 1 of 1
APPLICATION NO. : 10/685771
DATED : July 18, 2006
INVENTOR(S) : Bingham et al.

It is certified that error appears in the above-identified patent and that said Letters Patent is hereby corrected as shown below:

On the title page: Item [73] Eattelle Energy Alliance, LLC, Idaho, should read Battelle Energy Alliance, LLC.

Signed and Sealed this

Fifth Day of September, 2006

JON W. DUDAS
*Director of the United States Patent and Trademark Office*